Oct. 17, 1967     H. E. MENSER     3,347,505
PIPE HANGER BRACKET
Filed Nov. 17, 1965     2 Sheets-Sheet 1
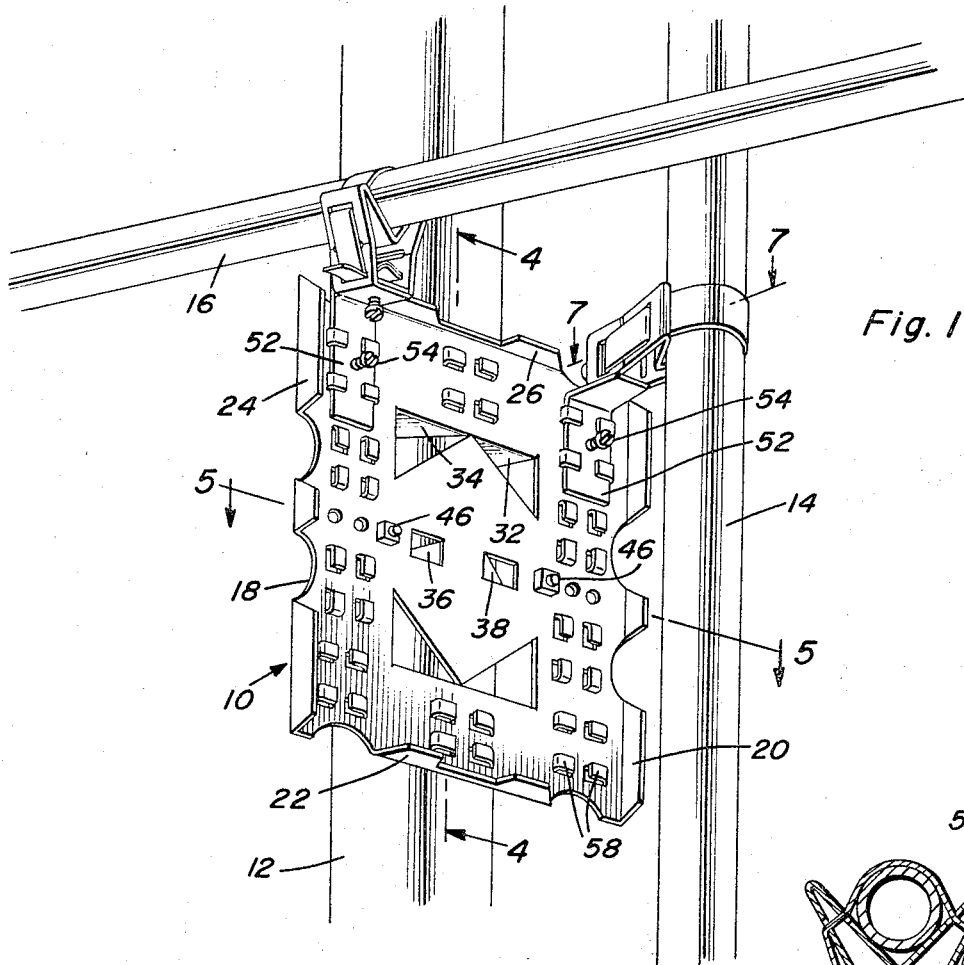
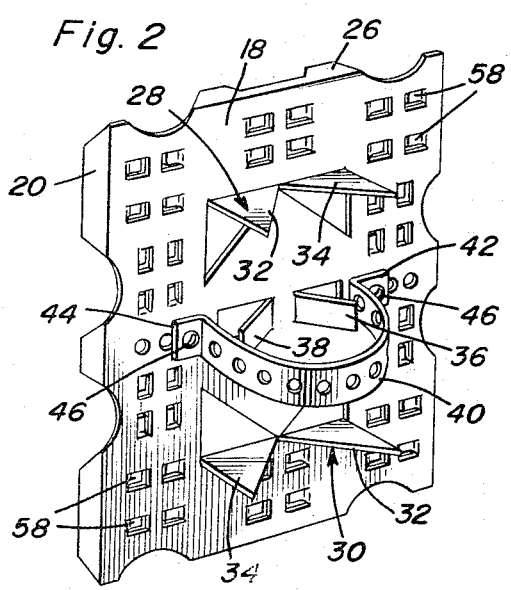
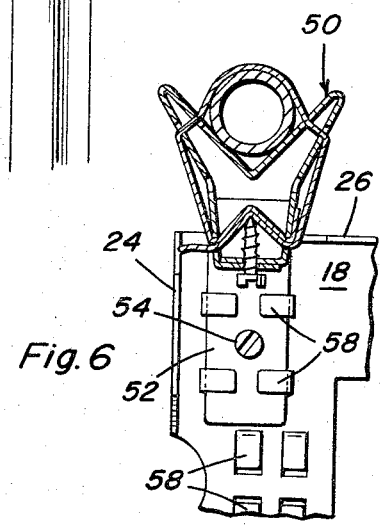
Henry E. Menser
INVENTOR.
BY Clarence A. O'Brien
and Harvey B. Jacobson
Attorneys Oct. 17, 1967   H. E. MENSER   3,347,505
PIPE HANGER BRACKET
Filed Nov. 17, 1965                2 Sheets-Sheet 2
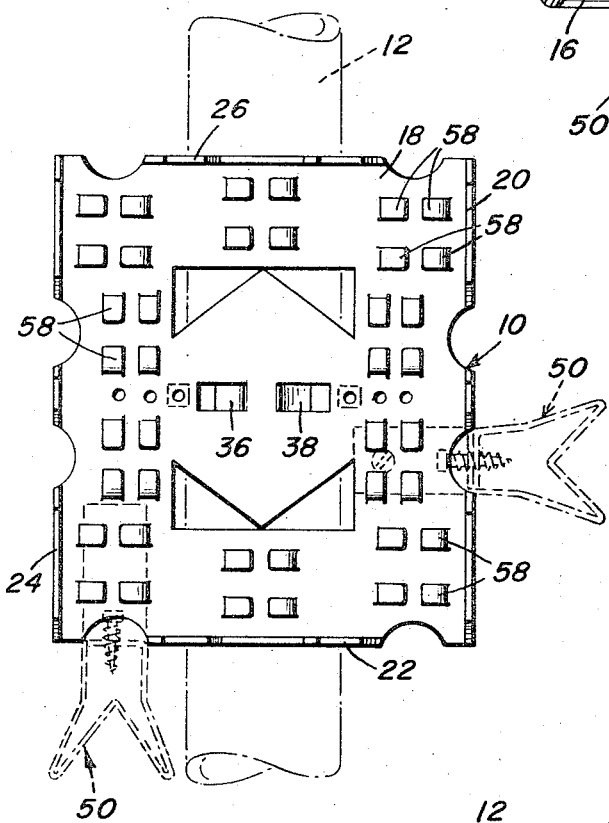
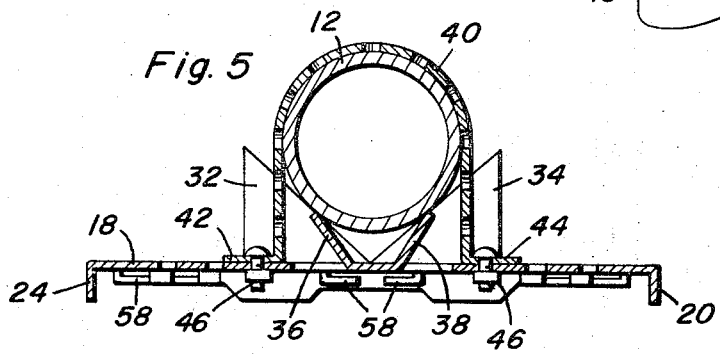
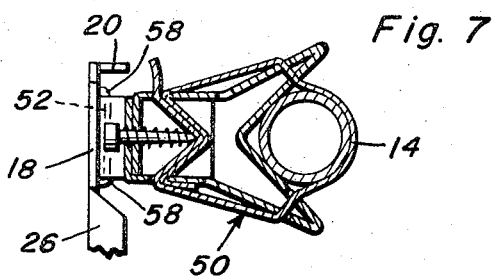
Henry E. Menser
INVENTOR.

United States Patent Office 3,347,505
Patented Oct. 17, 1967

3,347,505
PIPE HANGER BRACKET
Henry E. Menser, Hammond, Ind., assignor of one-eighth to Thomas H. Vance and Margaret C. Vance, jointly, both of Hammond, Ind.
Filed Nov. 17, 1965, Ser. No. 508,256
12 Claims. (Cl. 248—68)

ABSTRACT OF THE DISCLOSURE

A plate-like member including portions struck laterally outwardly from a central portion thereof inwardly of the marginal edge portions of said panel member defining a pair of spaced aligned cradle assemblies projecting outwardly of one side of the central portion of the plate-like member and a channel-shaped recess generally paralleling said plate-like member and extending between the cradle assemblies for embracingly receiving in the latter an elongated support member from which the plate-like member is to be supported, the plate-like member including means adapted to support at least one pipe member therefrom with the pipe member spaced at least slightly from the plate-like panel member.

---

This invention relates to a novel and useful pipe hanger bracket and more particularly to a hanger bracket adapted to be secured to a free standing elongated support member and to be utilized as a supporting brace between that support member and adjacent pipes or conduits.

The pipe hanger support bracket of the instant invention includes as one of its novel features that it is constructed entirely of sheet material except for readily available threaded fastening members and it is constructed in a manner such that it may be mass produced at low cost and compactly packaged for shipment from the manufacturer to the distributor or other user.

Still further, the pipe hanger bracket includes a plate-like mounting panel which is adapted to be supported from the aforementioned free standing elongated support member and also one or more pipe supports adapted to be clampingly engaged with a pipe or conduit which is adapted to be supported from the main supporting panel of the bracket in a variety of positions thereon. In this manner, pipes or conduits extending in a variety of directions relative to the elongated support member from which the hanger bracket is supported may be anchored to the free standing support member.

The main object of this invention is to provide a pipe hanger bracket including means for supporting one or more pipe or conduit sections from a free standing elongated support member.

Another object of this invention, in accordance with the immediately preceding object, is to provide a pipe hanger bracket adapted to support a plurality of pipe or conduit sections from a free standing support member and with the pipe or conduit sections angularly disposed relative to each other and the free standing support member.

Yet another object of this invention is to provide a pipe hanger bracket specifically adapted to be supported from a cylindrical free standing support member.

A final object of this invention to be specifically enumerated herein is to provide a pipe hanger bracket in accordance with the preceding object which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the pipe hanger bracket of the instant invention shown supported from a cylindrical free standing support member and being utilized to brace and support a pair of angularly disposed pipe sections from the support member;

FIGURE 2 is a perspective view of the pipe hanger bracket as seen from the rear side thereof;

FIGURE 3 is a front elevational view of the pipe hanger bracket with alternate positions of a pair of pipe supports shown in phantom lines;

FIGURE 4 is a fragmentary enlarged vertical sectional view taken substantially upon a plane indicated by the section line 4—4 of FIGURE 1;

FIGURE 5 is a fragmentary horizontal sectional view taken substantially upon the plane indicated by the section line 5—5 of FIGURE 1;

FIGURE 6 is a fragmentary enlarged vertical sectional view taken substantially upon the plane indicated by the section line 6—6 of FIGURE 4; and FIGURE 7 is a fragmentary horizontal sectional view taken substantially upon the plane indicated by the section line 7—7 of FIGURE 1 and on somewhat of an enlarged scale.

Referring now more specifically to the drawings the numeral 10 generally designates the pipe hanger bracket of the instant invention which is illustrated in FIGURE 1 as being supported from a free standing cylindrical upright support member 12 and has supporting two pipe sections 14 and 16 from the support member 12.

The pipe hanger bracket 10 comprises a generally rectangular panel constructed of any suitable sheet material such as galvanized metal or the like. The panel 18 includes pairs of opposite side laterally directed flange portions 20, 22, 24 and 26 which project forwardly from the front face of the panel 18 and also a pair of cradle assemblies 28 and 30 which project rearwardly of the rear face of the panel 18 and each comprises a pair of laterally struck generally triangular tabs 32 and 34. The cradle assemblies 28 and 30 are spaced longitudinally of a line extending between the flange portions 22 and 26 and define a channel-shaped recess which opens outwardly of the rear face of the panel 18 and generally parallels the latter.

In addition, a pair of oppositely inclined laterally struck tabs 36 and 38 are disposed between the cradle assemblies 28 and 30 and also serve to define the aforementioned channel-shaped recess extending between the cradle assemblies 28 and 30. Still further, a generally U-shaped clamp member 40 including apertured angulated end tabs 42 and 44 is secured to the panel 18 in any convenient manner such as by fasteners 46 and serves to clampingly secure the upright cylindrical support member 12 within the channel-shaped recess defined between the cradle assemblies 28 and 30. It will be noted that the oppositely inclined cut edge portions of the tabs 32 and 34 will have a tendency to bite into the material of which the support member 12 is constructed when the U-shaped clamp or clamp assembly 40 is tightened about the support member 12 in order to ensure that the pipe hanger bracket 10 is stationarily secured on the support member 12.

A plurality of pipe supports or clamp assemblies generally referred to by the reference numerals 50 are provided and provide substantial duplicates of the corresponding clamp assemblies disclosed in prior U.S. Patent No. 3,164,345, dated Jan. 5, 1965. Each of the clamp assemblies 50 includes a panel-like base portion 52 which is similar to the corresponding panel-like base portion of the clamp assembly disclosed in the above-mentioned prior patent but which is suitably apertured instead of slotted to receive therethrough a sheet metal fastener 54 for securement to the panel 18 in the desired locations. However, if it is desired, the base portions 52 may also be provided with centrally disposed longitudinally extending slots whereby the clamp assemblies 50 may be more easily adjusted in position relative to the plate 18.

The panel 18 includes a plurality of elongated pockets opening outwardly of the four marginal edge portions of the plate and through the various flange portions 20, 22, 24 and 26. Each of the elongated pockets is adapted to slidingly receive therein any of the elongated base portions 52 of the clamp assemblies 50 and is defined by pairs of oppositely facing laterally struck tabs 58 opening toward opposite sides of the corresponding pocket with the pairs of tabs 58 of each set of tabs 58 defining one pocket spaced longitudinally of that pocket. In addition, the various flange portions 20, 22, 24 and 26 are broken away or notched in those areas in alignment with the outer ends of adjacent pockets in order to provide clearance for the elongated base portion 52 of any clamp assembly 50 which is to be secured in any selected pocket defined by the tabs 58.

It may be seen from the several views of the drawings that the pipe hanger bracket 10 is constructed primarily of readily bendable sheet material and sheet material which may be readily worked to form the various laterally struck tabs 32, 34, 38 and 58 as well as the flange portions 20, 22, 24 and 26. If it is desired, the tabs 32 and 34 may have their cut edges cut free of the panel 18 and their marginal portions which are attached to the remainder of the panel 18 creased for future bending to the laterally directed positions and the flange portions 20, 22, 24 and 26 may be bent slightly less than 90 degrees relative to the medial plane of the panel 18 in order that the panels 18 may be readily stacked or nested for shipment from the manufacturer to the user. Of course, if this method of packaging is to be utilized, the clamp assemblies 40 and the clamp assembly 50 would be separately grouped and packaged for securement to the panel 18 at the point of use.

In FIGURE 1 of the drawings it may be seen that the pipe hanger bracket 10 has its panel 18 secured to the support member 12 and that a pair of the clamp assemblies 50 are utilized to support the pipe sections 14 and 16 from the panel 18. In FIGURE 3 of the drawings alternate positions of the clamp assemblies 50 are illustrated in phantom lines and it may therefore be seen that the pipe hanger bracket 10 of the instant invention is extremely versatile in supporting variously positioned pipe sections from a free standing support member such as the cylindrical support member 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pipe hanger bracket comprising a plate-like panel including portions struck laterally outwardly of one side of said panel and defining a pair of spaced aligned cradle assemblies projecting outwardly of said one side and a channel-shaped recess generally paralleling said plate and extending between said cradle assemblies adapted to embracingly receive therein an elongated support member from which said panel is to be supported, said panel including means adapted to be utilized to removably secure said support member in said recess, and means carried by said panel adapted to support at least one pipe member therefrom.

2. The combination of claim 1 wherein the laterally struck portions of said panel define generally V-shaped notches opening outwardly of said panel and defining said recess.

3. The combination of claim 2 wherein said laterally struck portions are substantially planar and disposed normal to the medial plane of said panel.

4. The combination of claim 1 including at least one pipe support, said pipe support including a first portion adapted to be clampingly engaged with a pipe and a second strap-like mounting foot portion, said panel including means defining a plurality of elongated pockets opening outwardly of at least one marginal edge portion of said panel and which are disposed in planes generally paralleling the medial plane of said panel, said strap-like mounting foot portion being longitudinally slidingly received in one of said pockets.

5. The combination of claim 4 including fastening means removably coacting with said panel and said foot portion releasably securing said foot portion in said one pocket.

6. The combination of claim 4 wherein said sockets are disposed on the other side of said panel.

7. The combination of claim 4 wherein said elongated pockets are each defined by pairs of opposite side laterally struck portions of said panel spaced longitudinally of the corresponding pocket, each of the last-mentioned laterally struck portions being elongated and generally tab-like in configuration with one end remaining secured to said panel and the other end portion cut free of said panel and extending transversely of and toward the other side of the corresponding pocket, the free ends of said tabs being spaced laterally outwardly of and generally paralleling said panel.

8. The combination of claim 1 wherein the marginal edge portions of said panel include generally right angulated panel stiffening flange portions.

9. The combination of claim 8 wherein said marginal edge portions and said flange portions have notches formed therein registered with the adjacent ends of said pockets.

10. A pipe hanger bracket comprising a plate-like panel including portions struck laterally outwardly from a central portion of said panel inwardly of the marginal edge portions thereof defining a pair of spaced aligned cradle assemblies projecting outwardly of one side of said central portion and a channel-shaped recess generally paralleling said plate and extending between said cradle assemblies adapted to embracingly receive therein an elongated support member from which said panel is to be supported, said panel including means adapted to be utilized to removably secure said support member in said recess, and means carried by said panel and projectable outwardly of any selected marginal edge portion of said panel adapted to support at least one pipe member therefrom.

11. The combination of claim 10 wherein said means carried by said panel adapted to support at least one pipe member therefrom includes at least one pipe support, said pipe support including a first portion adapted to be clampingly engaged with a pipe and a second strap-like mounting foot portion, said panel including means defining a plurality of elongated pockets opening outwardly of all marginal edge portions of said panel and which are disposed in planes generally paralleling the medial plane of said panel, said strap-like mounting foot portion being longitudinally slidingly received in one of said pockets.

12. The combination of claim 11 wherein said elongated pockets are each defined by pairs of opposite side laterally struck portions of said panel spaced longitudinally of the corresponding pocket, each of the last-mentioned laterally struck portions being elongated and generally tab-like in configuration with one end remaining secured to said panel and the other end portion cut free of said panel and extending transversely of and toward the other side of the corresponding pocket, the free ends of said tabs being spaced laterally outwardly of and generally paralleling said panel.

References Cited

UNITED STATES PATENTS

| | | | |
|---|---|---|---|
| 3,164,345 | 1/1965 | Menser | 248—68 |
| 3,212,741 | 10/1965 | Ericson | 248—58 |

ROY D. FRAZIER, *Primary Examiner.*

J. F. FOSS, *Assistant Examiner.*